United States Patent [19]

McCauley et al.

[11] 3,862,696
[45] Jan. 28, 1975

[54] TIRE CARRIER

[76] Inventors: Willard Mack McCauley, Rt. 1, Box 230, Okolona, Ark. 71962; Harvey Wayne McCauley, 104 Kathryn St., Prescott, Ark. 71857

[22] Filed: June 4, 1973

[21] Appl. No.: 366,851

[52] U.S. Cl............ 214/454, 224/42.21, 224/42.23
[51] Int. Cl............................................ B62d 43/04
[58] Field of Search .......... 214/451, 454, 453, 452; 224/42.12, 42.13, 42.14, 42.21, 42.23

[56] References Cited
UNITED STATES PATENTS

| | | | |
|---|---|---|---|
| 2,563,810 | 8/1951 | Ballard | 214/451 |
| 3,175,742 | 3/1965 | Cadmus | 214/451 |
| 3,187,914 | 6/1965 | Peras | 214/451 |
| 3,428,200 | 2/1969 | Graves | 214/454 |

Primary Examiner—Robert J. Spar
Assistant Examiner—John Mannix
Attorney, Agent, or Firm—William S. Dorman

[57] ABSTRACT

A tire carrier apparatus for use in conjunction with a vehicle undercarriage and comprising frame means pivotally mounted to the undercarriage of the vehicle, crank arm and cooperating bell crank means operably connected between the vehicle undercarriage and the free end of the frame means, operator means connected to the crank arm for pivoting the frame to an open position to accept a tire therein and for pivoting the frame to a closed position to secure the said tire between the frame means and the vehicle undercarriage. The apparatus is adjustable for accepting virtually any size tire and is provided with locking means for positively locking the frame means in a closed position.

5 Claims, 4 Drawing Figures

TIRE CARRIER

BACKGROUND OF THE INVENTION

1. Field of the Invention

This invention relates to improvements in vehicle tire carriers and more particularly but not by way of limitation to a tire carrier apparatus which may be mounted beneath a vehicle, under a truck bed for securely transporting a spare tire or the like therein.

2. Description of the Prior Art

Presently available spare tire holders for trucks and the like which mount beneath a truck bed or undercarriage normally require the removal of several bolts or nuts in order to effect the release of the tire being carried therein. These tire carriers have the particular disadvantage of being difficult for one man to manage. Often the nuts being removed therefrom are lost or misplaced and are many times covered by ice or mud and the like which must be cleaned off prior to removing the tire therefrom.

Other tire carriers have a pivotal mount such as the one disclosed in the patent to Graves et al. U.S. Pat. No. 3,428,200 issued 1969 and entitled "Spare Tire Carrier." The Graves et al device employs a crank arm and bell crank means for raising and lowering the frame segment but has a particular disadvantage of requiring the mounting thereof to be at a particular location on the vehicle undercarriage so that some portion of the vehicle extends downwardly below the level of the tire being held therein in order to keep the tire from slipping out after the frame has been lifted into place. If some existing portion of the vehicle does not meet this requirement, the said vehicle would have to be modified in order to utilize the Graves et al device thereon.

SUMMARY OF THE INVENTION

The present invention contemplates a novel tire carrier apparatus which is designed and constructed for overcoming the above disadvantages. The tire carrier apparatus is provided with a frame member which may be pivotally mounted beneath a truck bed or vehicle undercarriage at virtually any desired location. A pair of spaced crank arm members are secured to a common crank arm operator rod directly above the free end of the pivotally mounted frame member and operably connected thereto by means of a pair of bell cranks which are pivotally secured between the crank arm members and the frame means. The crank arm operator rod is provided with an ordinary lug bolt-sized head so that it may be rotated with a standard lug wrench ordinarily carried by such vehicles.

The said frame means may be lowered by turning the operator rod which will release the tire being carried therein with a minimum of effort and regardless of any ice or mud which may be collected on the apparatus. When the tire is located in place on the tire carrying frame and the said frame raised again to its closed position, the tire is pinched between the frame means and the undercarriage of the vehicle and is prevented from shaking loose or slipping out by being also located adjacent to the operator rod which acts as a stop means to prevent the said tire from slipping when the apparatus is in a closed position.

It is therefore obvious that the present invention may be installed in virtually any desired location beneath the vehicle bed or undercarriage and does not require any other parts of the vehicle, except the bottom of the vehicle undercarriage to keep the said tire in place.

The apparatus is provided with a safety latch which automatically locks into place whenever the apparatus is in a closed position and the said frame cannot be lowered without a manual release of the said safety latch. Means are also provided for locking the said frame into position by means of an ordinary padlock to prevent tire theft when the vehicle is unattended.

DESCRIPTION OF THE DRAWINGS

Other and further advantageous features of the present invention will hereinafter more fully appear in connection with a detailed description of the drawings in which.

DETAILED DESCRIPTION OF THE INVENTION

Figure 1:
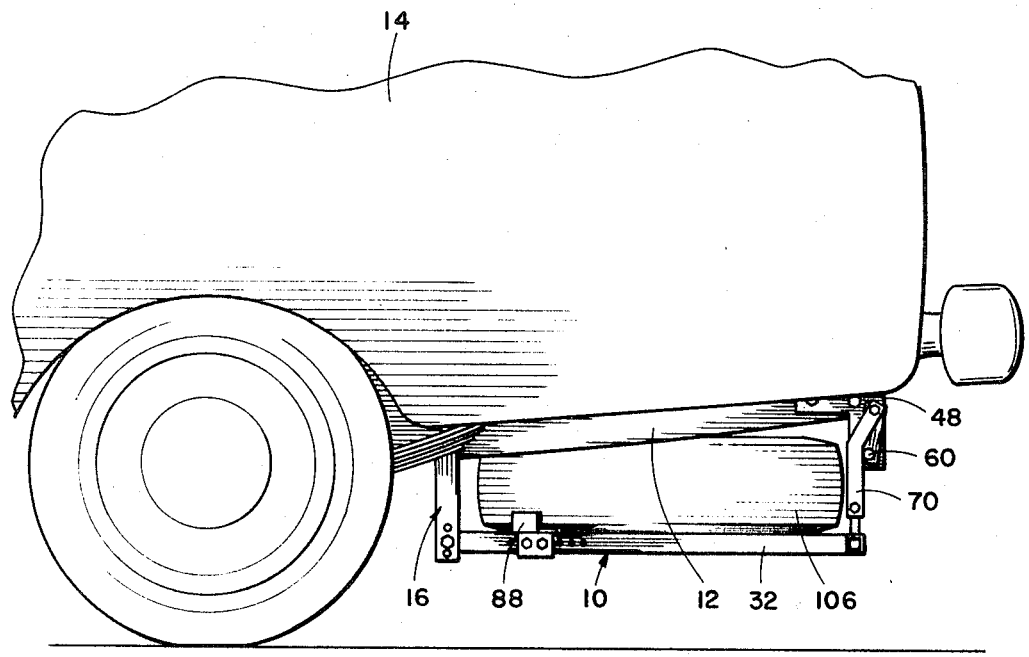
FIG. 1 is an elevational view of a vehicle having a tire carrier mounted thereunder which embodies the present invention.

Referring to the drawings in detail, reference character 10 generally indicates a tire carrier apparatus which is mounted on the underside of a truck bed 12 of a vehicle 14. The carrier apparatus 10 comprises a substantially inverted U-shaped bracket member 16 having an upper cross member 18 which is bolted directly to the frame or undercarriage of the truck bed 12. Each end of the cross member 18 is provided with a downwardly extending bracket arm 20 and 22 and may be provided with a brace member 24 welded therebetween. The lower ends of the arm members 20 and 22 are provided with a plurality of vertically spaced pivot mounting bores 26 and the downwardly extending arm 22 is also provided with a plurality of spaced pivot mounting bores 28, each bore 28 being coaxially aligned with a corresponding bore 26 of the arm 20.

The apparatus 10 also comprises a frame means 30 which is pivotally secured to the bracket member 16 in a manner as will be hereinafter set forth. The frame means 30 comprises a pair of spaced parallel bars 32 and 34, each of said bars 32 and 34 being rigidly secured at one end thereof to an elongated cross bar frame member 36 by welding or other suitable means. The elongated bar 36 is somewhat longer than the spacing between the bars 32 and 34 so that the ends of the said bar 36 extend outwardly on either side of the bar 32 and the bar 34. The opposite end of the bar 32 is pivotally secured to the downwardly extending bracket arms 20 by means of a pivot pin 38 which extends through one of the bores 26 of the said arm 20. The opposite end of the bar 34 is likewise pivotally mounted by means of a suitable pivot pin 40 through one of the bores 28 of the downwardly extending bracket arm 22. The bar 34 is provided with a plurality of spaced bores 42 extending therealong adjacent to the end which is pivotally mounted to the bracket 16. The bar 32 is likewise provided with a plurality of spaced bores (not shown) therealong each of said bores being in substantial alignment with the corresponding bores 42 of the bar 34. Each end of the elongated cross bar member 36 is provided with an upwardly extending attach bracket 44 and 46 for a purpose that will be hereinafter set forth.

The tire carrier apparatus 10 also comprises a pair of spaced mounting brackets 48 and 50, the said bracket 48 being secured directly to the vehicle undercarriage or truck bed 12 and having a downwardly extending bracket arm 52 attached thereto. The bracket arm 52 is disposed substantially above the attach bracket 44 of the frame cross member 36. The bracket 50 is substantially identical to the bracket 48 and is provided with a downwardly extending bracket arm 54 which is disposed substantially above the attach bracket 46 on the opposite end of the frame cross member 36. The bracket arm 52 and 54 are provided with transverse bores 56 and 58 therethrough, respectively for a purpose that will be hereinafter set forth. An elongated operator rod 60 is rotatably secured to the lower ends of the downwardly extending bracket arms 52 and 54, one end of the said rod 60 extending beyond the bracket arm 54 and being provided with a hexagonal nut 62 rigidly secured to the outer end thereof. The nut 62 should be of a standard size to be operated by an ordinary vehicle tire lug wrench (not shown).

An elongated crank arm member 64 is rigidly secured at one end thereof to the operator rod 60 so that it will rotate simultaneously therewith, the said crank arm member 64 being disposed on one end of the operator rod 60 adjacent to the outside of the bracket member 48, a second substantially identical crank arm member 66 is secured to the operator rod 60 adjacent to the outside of the bracket member 50, the said crank arm 66 being disposed substantially parallel to the crank arm 64.

An elongated bell crank 68 having a recessed portion 70 therein is pivotally connected at one end to the outer end of the crank arm 64 by means of a suitable bell crank 68 pivot pin 72, the opposite end of the bell crank 68 being pivotally connected to the upwardly extending attach bracket 44 of the frame member 36 by means of a pivot pin 75. A second substantially identical bell crank 74 having a recessed portion 76 therein is pivotally secured at one end thereof to the outer end of the crank arm 66 by means of a suitable pivot pin 78, the opposite end of the bell crank 74 being pivotally secured to the upwardly extending attach bracket 46 of the frame member 36 by a suitable pivot pin 80.

A first tire stop bracket 82 having an upwardly extending vertically disposed plate 84 secured thereto is bolted to the frame member 34 at a predetermined location using the bores 42 therein, in a manner so that the vertically disposed plate 84 faces inwardly toward the middle of the apparatus 10. A substantially identical tire stop bracket 86 having a vertically disposed plate 88 is secured to the frame member 32 directly opposite the tire stop bracket 82 in a similar manner with the said vertically disposed plate 88 facing the center portion of the apparatus 10.

A latching mechanism generally indicated by reference character 90 comprises a pivot pin 92 which is pivotally secured to the bracket member 50 and spaced a short distance from the downwardly extending bracket arm 54. The pin 92 is provided with an outwardly extending lock member 94 which is rigidly secured thereto, the outer end of the lock member 94 is provided with an outwardly extending handle member 96 having a bent portion 98 located at the outer end thereof. The handle member 96 is operably connected to the operator rod 60 by a suitable tension spring 100, the said spring 100 tending to keep the handle member 96 and associated locking member 94 drawn toward the operator rod 60 for a purpose that will be hereinafter set forth.

Figure 3:
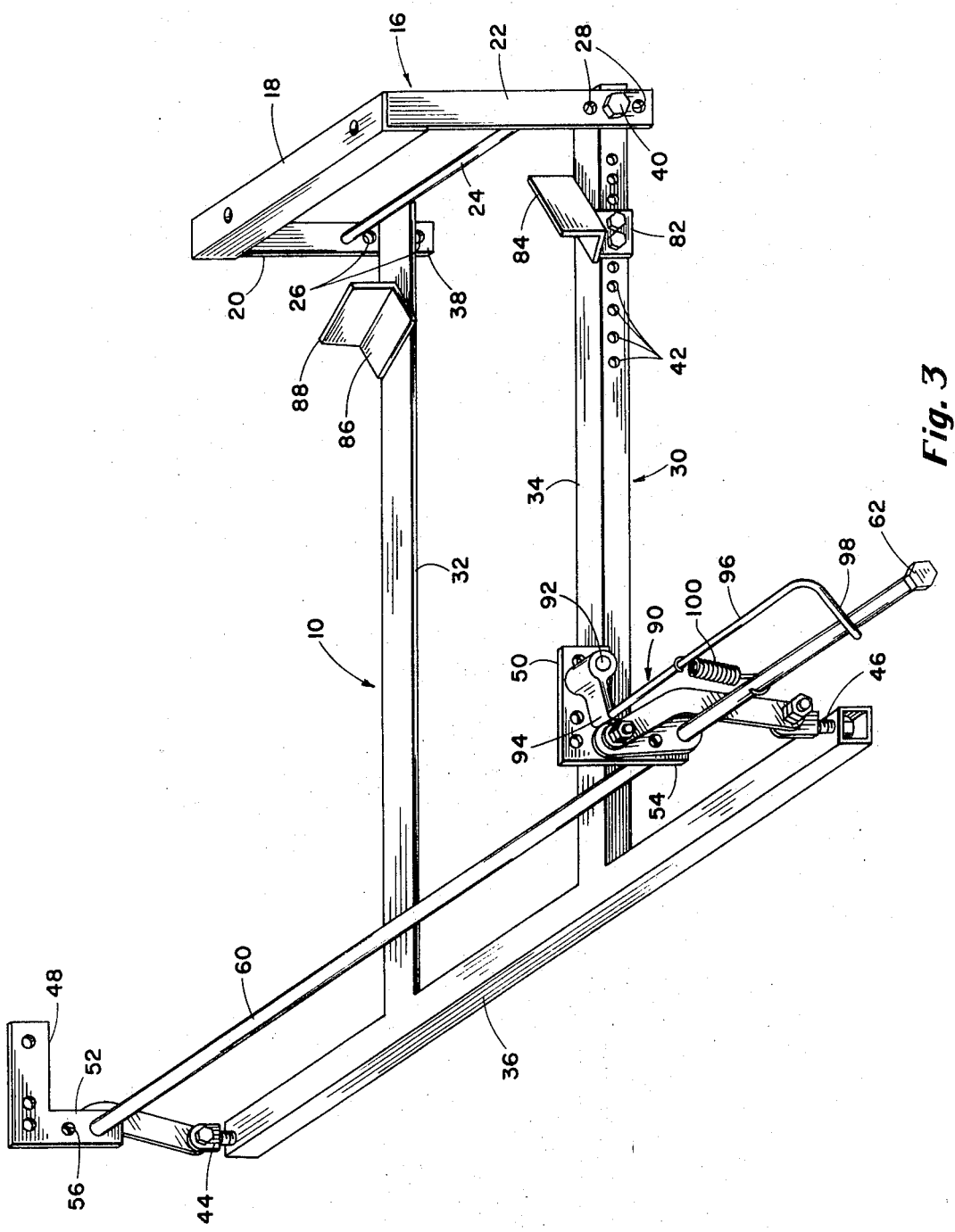
FIG. 3 is a perspective view of a tire carrying apparatus embodying the present invention, the said apparatus being in a closed position.

The crank arm 64 is provided with a transversely extending bore 102 therethrough, the said bore being spaced from the operator rod 60 by a distance equal to that of the bore 56 of the bracket member 48. Likewise, the crank arm 66 is provided with a transversely extending bore 104 therethrough, said bore being spaced from the operator rod 60 by an amount equal to that of the bore 58 of the bracket member 50 so that when the frame means is in its lifted or closed position as shown in FIGS. 1 and 3, the bores 56 and 102 are in alignment and the bores 58 and 104 are in alignment for accepting an ordinary padlock shackle therethrough for locking the said apparatus in a closed position.

Figure 2:
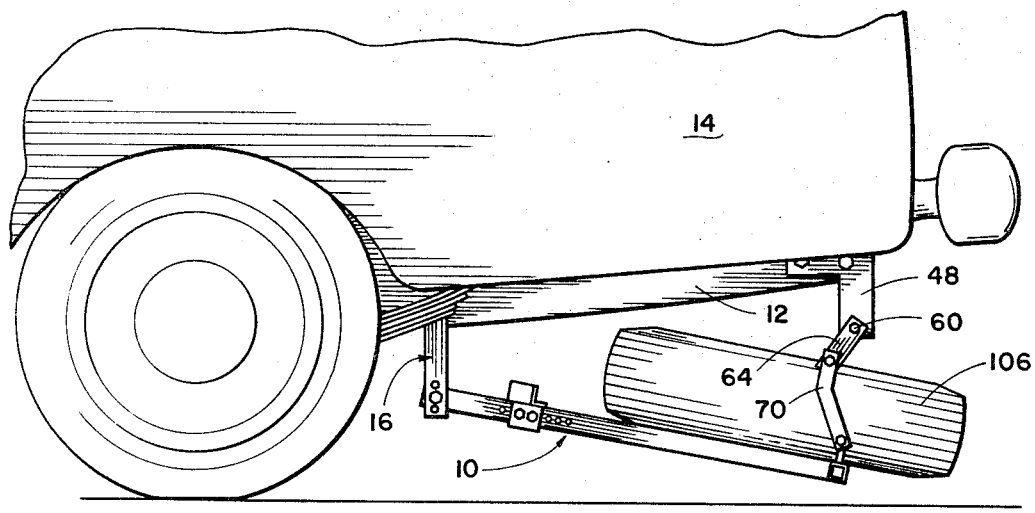
FIG. 2 is a elevational view of the apparatus of FIG. 1 in an open or lowered position.
Figure 4:
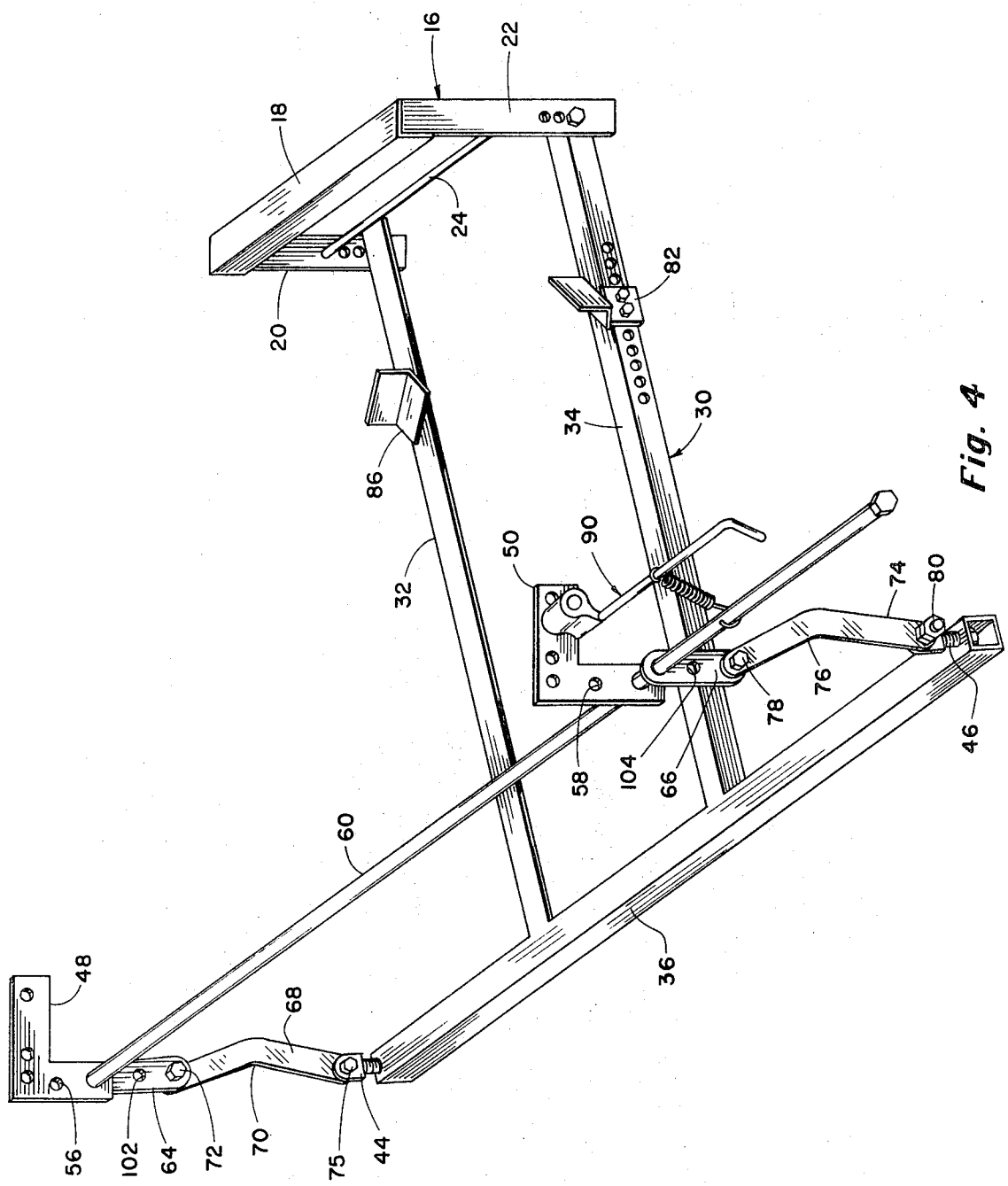
FIG. 4 is a perspective view of the tire carrier apparatus of FIG. 3 in an open position.

Referring now to the drawings, FIGS. 2 and 4 depict the apparatus 10 in an open position for accepting a tire 106 therein or releasing a tire which has been stored in the apparatus 10. When the apparatus 10 is to be installed on the vehicle 14, the brackets 16, 48, and 50 are simply bolted to the existing vehicle undercarriage frame 12 and the frame members 32 and 34 are pivotally secured to the bracket means 16 as hereinbefore set forth, utilizing the attachment bores 26 and 28 which are suitable for the size of tire to be stored therein. The height of adjustment should be sufficient for the tire to be pinched between the frame members 32 and 34, and the vehicle undercarriage frame member 12. The stop brackets 82 and 86 should then be adjusted to the diameter of the tire 106 so then that when the said tire 106 is pushed against the vertically disposed flat plates 84 and 88, the opposite side of the tire will fit directly behind the operator rod 60 when the apparatus is in a closed position to prevent the said tire from movement in an opposite direction from the stop brackets 82 and 86.

The tire 106 may then be loaded into the apparatus through the aperture formed between the operator rod 60 above, the cross frame member 36 below, and the bell crank members 68 and 74 on either side as shown in FIG. 2. An ordinary lug wrench or the like (not shown) is then attached to the operator nut 62 of the operator arm 60 and rotated in a counter clockwise direction as shown in FIGS. 3 and 4 thereby causing the crank arms 64 and 66 to also be turned in a counter clockwise direction thereby lifting the bell crank members 68 and 74 which in turn lifts the frame means 30 with the tire 106 attached thereto upwardly to the position as shown in FIGS. 1 and 3 thereby locking the said tire 106 into place between the frame means 30 and the vehicle undercarriage frame 12. The said tire is then unable to slip out sidewise due to the stop brackets 82 and 86 and the operator rod 60.

It is noted that as the crank arm 66 and associated bell crank 74 are raised past the latch arm 94, the said latch arm 94 is lifted against the pressure of the spring 100 so that when the crank arm 66 and bell crank member 74 is rotated to its highest position, the said latch member 94 is pulled downwardly against the said crank arm and bell crank thereby latching them into position with the recessed portion 76 of the bell crank 74 being against the operator rod 60.

In order to release the tire therefrom, it is necessary to first release the latching arm 94 by rotation of the handle member 96 thereof in a clockwise direction as shown in FIGS. 3 and 4 and simply twisting the operator rod 60 in a clockwise direction thereby lowering the frame means 30 and releasing the tire 106 therefrom.

From the foregoing, it will be apparent that the present invention provides a tire carrier apparatus particularly designed and constructed for ease of installation beneath a truck bed or the like which squeezes the said tire between the carrier frame and the truck frame which tends to eliminate bounce or rattle thereof. The novel tire carrier is adjustable to accept different sized tires, is operable by an ordinary vehicle lug wrench and is virtually unaffected by mud, snow or ice. The tire carrier will carry an inflated or flat tire, or can be buckled up without a tire in the carrier. The novel tire carrier is economical and durable in construction and simple and efficient in operation.

Whereas, the present invention has been described in particular relation to the drawings attached hereto, it should be understood that other and further modifications, apart from those shown or suggested herein, may be made within the spirit and scope of this invention.

What is claimed is:

1. A tire carrier apparatus for use in conjunction with a vehicle undercarriage and comprising first bracket means secured to the undercarriage of the vehicle; a carriage frame pivotally secured to said first bracket means for carrying a tire thereon; second bracket means secured to the vehicle undercarriage and spaced from said first bracket means; said second bracket means comprising a pair of spaced brackets disposed on a line which is substantially parallel to the axis of rotation of the pivotally mounted frame; an operator rod rotatably connected to both said brackets for rotation about an axis parallel to said axis of rotation of said frame; a pair of spaced crank arms rigidly secured to said operator rod, one said crank arm being disposed adjacent to each of the spaced brackets; a pair of spaced bell cranks, one said bell crank being pivotally connected between one crank arm and one side of said frame, the other said bell crank being pivotally connected between the opposite crank arm and the opposite side of said frame; and means for rotating the operator rod to raise and lower the free end of the frame; the end of said apparatus providing an open tire-receiving aperture which is formed by the spaced bell cranks and crank arms on the sides, the operator rod above and the frame below when said frame is lowered; said aperture being closed by said operator rod when said frame is raised.

2. A tire carrier apparatus as set forth in claim 1 wherein latching means is secured to the second bracket means and operably engagable with a crank arm when the said frame is raised for latching the said frame in a raised position, and release means attached to the latching means for manually releasing the said latching means for lowering the said frames.

3. A tire carrier apparatus as set forth in claim 1 wherein locking means is provided on the second bracket means and a crank arm for locking the said frame in a raised position.

4. A tire carrier apparatus as set forth in claim 1 wherein the frame means is adjustable with respect to the first bracket means to compensate for tires of different thicknesses.

5. A tire apparatus as set forth in claim 1 wherein adjustable tire stop means is provided on the frame to compensate for tires having different diameters.

* * * * *